United States Patent
Kang et al.

(10) Patent No.: US 8,383,265 B2
(45) Date of Patent: Feb. 26, 2013

(54) LITHIUM SECONDARY BATTERY COMPRISING ELECTRODE ACTIVE MATERIAL CONTAINING SURFACTANT

(75) Inventors: Eun Ju Kang, Daejeon (KR); Hyang Mok Lee, Seoul (KR); Kichul Hong, Seoul (KR); Jung Kyu Woo, Daegu (KR)

(73) Assignee: LG Chem, Ltd. (KR)

( * ) Notice: Subject to any disclaimer, the term of this patent is extended or adjusted under 35 U.S.C. 154(b) by 473 days.

(21) Appl. No.: 12/223,688

(22) PCT Filed: Feb. 1, 2007

(86) PCT No.: PCT/KR2007/000536
§ 371 (c)(1),
(2), (4) Date: Mar. 6, 2009

(87) PCT Pub. No.: WO2007/091798
PCT Pub. Date: Aug. 16, 2007

(65) Prior Publication Data
US 2010/0009257 A1    Jan. 14, 2010

(30) Foreign Application Priority Data
Feb. 6, 2006  (KR) .................. 10-2006-0010947

(51) Int. Cl.
*H01M 4/60* (2006.01)

(52) U.S. Cl. ....................................... 429/215
(58) Field of Classification Search ........... 429/215
See application file for complete search history.

(56) References Cited

U.S. PATENT DOCUMENTS

| | | | |
|---|---|---|---|
| 6,183,901 B1 | 2/2001 | Ying et al. | |
| 6,280,883 B1 * | 8/2001 | Lamanna et al. | 429/307 |
| 6,632,569 B1 * | 10/2003 | Kameda et al. | 429/231.8 |
| 6,673,273 B2 | 1/2004 | Ba Le et al. | |
| 6,878,487 B2 | 4/2005 | Cho et al. | |

FOREIGN PATENT DOCUMENTS

JP    2002-164086 A    6/2002

* cited by examiner

*Primary Examiner* — Stuart Hendrickson
(74) *Attorney, Agent, or Firm* — Lerner, David, Littenberg, Krumholz & Mentlik, LLP

(57) ABSTRACT

Provided is a lithium secondary battery comprising a lithium transition metal compound-containing cathode and a graphitized carbon-containing anode with addition of a surfactant to the cathode and/or the anode, whereby the addition of the surfactant improves the wettability of an electrolyte on the electrode, thereby increasing the battery capacity and improving rate properties and cycle properties of the battery, in conjunction with a significant reduction of a manufacturing process time of the battery.

3 Claims, No Drawings

LITHIUM SECONDARY BATTERY COMPRISING ELECTRODE ACTIVE MATERIAL CONTAINING SURFACTANT

CROSS REFERENCE TO RELATED APPLICATIONS

The present application is a national phase entry under 35 U.S.C. §371 of International Application No. PCT/KR2007/000536, filed Feb. 1, 2007, published in English, which claims priority from Korean Patent Application No. 10-2006-0010947, filed Feb. 6, 2006, all of which are incorporated herein by reference.

TECHNICAL FIELD

The present invention relates to a lithium secondary battery comprising a lithium transition metal compound-containing cathode and a graphitized carbon-containing anode with addition of a surfactant to the cathode and/or the anode, whereby the addition of the surfactant improves the wettability of an electrolyte on the electrode, thereby increasing the battery capacity and improving rate and cycle properties of the battery, in conjunction with a significant reduction of a manufacturing process time of the battery.

BACKGROUND ART

Technological development and increased demand for mobile equipment have led to a rapid increase in the demand for secondary batteries as an energy source. Among other things, a great deal of research and study has been focused on lithium secondary batteries having a high-energy density and a high-discharge voltage. These lithium secondary batteries are also commercially available and widely used.

The lithium secondary battery uses a metal oxide such as $LiCoO_2$ as a cathode active material and a carbonaceous material as an anode active material, and is fabricated by disposition of a porous polyolefin separator between the anode and the cathode and addition of a non-aqueous electrolyte containing a lithium salt such as $LiPF_6$. Upon charging, lithium ions deintercalate from the cathode active material and intercalate into a carbon layer of the anode. In contrast, upon discharging, lithium ions deintercalate from the carbon layer of the anode and intercalate into the cathode active material. Here, the non-aqueous electrolyte serves as a medium through which lithium ions migrate between the anode and the cathode. Such a lithium secondary battery must be basically stable in an operating voltage range of the battery and must have an ability to transfer ions at a sufficiently rapid rate.

The non-aqueous electrolyte is incorporated into the battery at the final step of fabrication of the lithium secondary battery. Here, in order to reduce a period of time taken to fabricate the battery and optimize the battery performance, it is necessary to ensure rapid and complete wetting of the electrodes by the electrolyte.

As the non-aqueous electrolyte for the lithium secondary battery, non-protic organic solvents such as ethylene carbonate (EC), diethyl carbonate (DEC) and 2-methyl tetrahydrofuran are largely used. Such an electrolyte is a polar solvent having a polarity to an extent that can effectively dissolve and dissociate electrolyte salts and at the same time, is a nonprotic solvent having no active oxygen species. In addition, such an electrolyte often exhibits high viscosity and surface tension, due to extensive interaction of the electrolyte. Therefore, the non-aqueous electrolyte for the lithium secondary battery exhibits a low affinity for electrode materials containing a binder such as polytetrafluoroethylene, polyvinylidene fluoride and the like, and therefore results in a failure to achieve easy wetting of the electrode materials. Such a failure of easy wetting due to the low affinity, as will be illustrated hereinafter, is one of the primary causes which are responsible for an ineffective increase of the battery production time.

Meanwhile, miniaturization and very strict structure of the lithium secondary batteries have been recently required with increased demands thereof due to high preference toward small size devices such as mobile phones, notebook computers and MP3 players. Further, adoption of high-energy density batteries has led to increased electrode loading and thickness upon fabrication of the battery. However, due to a failure in deep penetration of the electrolyte having hydrophilic properties into the electrodes having hydrophobic properties, the capacity of the battery is lowered, which in turn reduces rate properties and cycle properties of the battery.

Therefore, conventional arts have been attempted to solve such problems by using specific process techniques such as addition of a high-temperate aging process or application of vacuum or pressure so as to promote wetting of the electrolyte on the battery. However, such methods suffer from a burden of extra expense for additional processes and a prolonged production period of time.

To this end, there is a strong need in the art for the development of a technology which is capable of reducing a battery fabrication time and improving the battery performance by increasing the wettability of the elecrodes to the electrolyte during fabrication of the battery.

DISCLOSURE OF INVENTION

Technical Problem

Therefore, it is an object of the present invention to solve the above problems, and other technical problems that have yet to be resolved.

As a result of a variety of extensive and intensive studies and experiments to solve the problems as described above, the inventors of the present invention, as will be illustrated hereinafter, have discovered that, upon addition of a surfactant to a cathode and/or an anode of a lithium secondary battery, this may result in very easy penetration of an electrolyte into electrode materials while having minimized adverse side effects on the battery operation, thereby obviating a necessity of an additional process for improvement of the wettability, and it is therefore possible to improve the battery performance. The present invention has been completed based on these findings.

Technical Solution

In accordance with an aspect of the present invention, the above and other objects can be accomplished by the provision of a lithium secondary battery comprising a lithium transition metal compound-containing cathode and a graphitized carbon-containing anode with incorporation of a surfactant into either or both of the cathode and the anode.

According to the present invention, the addition of the surfactant improves the wettability of an electrolyte on the electrode, thereby increasing the battery capacity and improving rate properties and cycle properties of the battery, in conjunction with a significant reduction of a manufacturing process time of the battery.

Generally, the surfactant has a hydrophilic portion and a hydrophobic portion, and therefore exhibits an affinity for both of the electrolyte having hydrophilic properties and the electrodes having hydrophobic properties. Therefore, upon the addition of such a surfactant to the electrodes, the hydrophilic portion of the surfactant will have a high affinity for the hydrophilic electrolyte, whereas the hydrophobic portion of the surfactant will have a high affinity for the hydrophobic electrode. As a result, the electrolyte can easily penetrate into the electrode by the medium of the surfactant. Consequently, it is possible to improve the wettability of the electrolyte on the electrode.

The surfactant is added in an amount of 0.01 to 20% by weight, preferably 0.1 to 1.0% by weight, based on the total weight of an electrode mix to be added. The electrode mix is a mixture of an electrode active material, and if necessary, a binder and a conductive material. For example, a cathode mix is typically composed of a cathode active material in admixture with both of the binder and the conductive material. Where a content of the surfactant is excessively low, it is difficult to achieve desired improvement in the wettability of the electrolyte on the electrode. On the other hand, where a content of the surfactant is excessively high, this may undesirably result in problems associated with deterioration of other properties of the battery, due to decreases in the addition amounts of the binder and the conductive material.

The surfactant may be added to either or both of the cathode and the anode. Addition of the surfactant to the anode is particularly preferred, because the amount of the electrolyte contained in the anode of the battery is much smaller than that of the cathode.

Among conventional arts relating to addition of the surfactant, some techniques of adding surfactants to electrolytes other than electrodes are known. That is, in order to reduce irreversibility in the battery utilizing an amorphous carbon material as an anode active material, there is known a method of adding the surfactant, which forms a solid electrolyte interface film on the surface of the anode active material upon initial charge/discharge of the battery, to the electrolyte. Even though the addition of the surfactant to the electrolyte provides increases of the battery capacity and improvements of rate properties of the battery via reduction of the irreversibility, this may lead to changes in intrinsic properties of the surfactant, because the surfactant forms the solid electrolyte interface film on the surface of the anode active material through an electrochemical reaction, during the initial charge/discharge processes.

On the other hand, the present invention involves the addition of the surfactant to the electrode, and exhibits a significant difference in that it is possible to maintain the intrinsic properties of the surfactant intact while not causing such an electrochemical reaction. In addition, it is possible to achieve a significant reduction of the battery manufacturing process time due to improved wettability of the electrolyte on the electrode, and this is a unique feature of the present invention which cannot be obtained by the above-mentioned conventional arts.

Generally, the surfactant is classified into an anionic surfactant, a cationic surfactant, a zwitterionic surfactant, and a nonionic surfactant. The battery is operated by an electrochemical reaction via the migration of lithium ions. Therefore, the surfactant according to the present invention is preferably the nonionic surfactant. Typical examples of the nonionic surfactant may include, but are not limited to, polyoxyethylene alkyl ether, polyoxyethylene fatty acid ester, polyoxyethylene alkylphenol ether, sorbitan fatty acid ester, polyoxyethylene sorbitan fatty acid ester, sucrose fatty acid ester, and the like.

Particularly, more preferred is a block copolymer having both of a hydrophilic portion and a hydrophobic portion, as the surfactant of the present invention.

Usually, the block copolymer refers to a copolymer where a chain having a given amount of one type of a monomer is chemically linked to a chain having a given amount of another type of a monomer having different properties. As the preferred surfactant of the present invention, the block copolymer is a copolymer formed by crossing of chemical bonds between the chain consisting of hydrophilic monomers and the chain consisting of hydrophobic monomers, and is characterized in that the block copolymer per se has both of the hydrophilic portion and the hydrophobic portion.

As a particularly preferred example of the block copolymer, mention may be made of a PEO-PPO block copolymer. The PEO-PPO block copolymer has a structure consisting of a hydrophilic polyethylene oxide (PEO) chain and a hydrophobic polypropylene oxide (PPO) chain as a repeating unit. The PEO-PPO block copolymer has very little effects on the operation mechanism of the battery. As illustrated hereinbefore, the PEO-PPO block copolymer can also significantly improve the wettability of the electrolyte on the electrode, due to possession of hydrophilic and hydrophobic portions in the molecular structure. Preferably, the content of PEO unit in the PEO-PPO block copolymer is in a range of 40 to 80%, based on the total weight of the copolymer.

Among PEO-PPO block copolymers, a triblock copolymer with a PEO-PPO-PEO structure is particularly preferred. The content of PEO unit in the PEO-PPO-PEO triblock copolymer is particularly preferably in a range of 60 to 70% by weight, based on the total weight of the copolymer.

Another example of the surfactant that can be preferably used in the present invention may include perfluoroalkyl sulfonate. Perfluoroalkyl sulfonate is an anionic surfactant, exhibits substitutionality for both of the electrolyte and the electrode material, and is highly stable in an electrochemical reaction system of the battery, since all of hydrogen atoms in the alkyl portion are substituted with fluorine atoms. A representative example of the perfluoroalkyl sulfonate may include, but is not limited to, perfluorobutane sulfonate.

Hereinafter, other components necessary for the lithium secondary battery according to the present invention will be briefly described.

The cathode for the lithium secondary battery is, for example, fabricated by applying a mixture of a cathode active material, a conductive material and a binder to a cathode current collector, followed by drying. If necessary, a filler may be further added to the above mixture.

Examples of the cathode active materials that can be used in the present invention may include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ ($0 \leq x \leq 0.33$), $LiMnO_3$, $LiMn_2O_3$ and $LiMnO_2$; lithium copper oxide ($Li_2CuO_2$); vanadium oxides such as $LiV_3O_8$, $V_2O_5$ and $Cu_2V_2O_7$; Ni-site type lithium nickel oxides of Formula $LiNi_{1-x}M_xO_2$ (M=Co, Mn, Al, Cu, Fe, Mg, B or Ga, and $0.01 \leq x \leq 0.3$); lithium manganese composite oxides of Formula $LiMn_{2-x}M_xO_2$ (M=Co, Ni, Fe, Cr, Zn or Ta, and $0.01 \leq x \leq 0.1$), or Formula $Li_2Mn_3MO_8$ (M=Fe, Co, Ni, Cu or Zn); $LiMn_2O_4$ wherein a portion of Li is substituted with alkaline earth metal ions; disulfide compounds; and $Fe_2(MoO_4)_3$, $LiFe_3O_4$, etc.

The cathode current collector is generally fabricated to have a thickness of 3 to 500 □. There is no particular limit to materials for the cathode current collector, so long as they have high conductivity without causing chemical changes in the fabricated battery. As examples of the materials for the cathode current collector, mention may be made of stainless steel, aluminum, nickel, titanium, sintered carbon, and aluminum or stainless steel which was surface-treated with carbon, nickel, titanium or silver. The current collector may be fabricated to have fine irregularities on the surface thereof so as to enhance adhesion to the cathode active material. In addition, the current collector may take various forms including films, sheets, foils, nets, porous structures, foams and non-woven fabrics.

The conductive material is typically added in an amount of 1 to 50% by weight, based on the total weight of the mixture including the cathode active material. There is no particular limit to the conductive material, so long as it has suitable conductivity without causing chemical changes in the fabricated battery. As examples of conductive materials, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The binder is a component assisting in binding between the active material and conductive material, and in binding with the current collector. The binder is typically added in an amount of 1 to 50% by weight, based on the total weight of the mixture including the cathode active material. As examples of the binder, mention may be made of polyvinylidene fluoride, polyvinyl alcohols, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber and various copolymers.

The filler is an optional ingredient used to inhibit cathode expansion. There is no particular limit to the filler, so long as it does not cause chemical changes in the fabricated battery and is a fibrous material. As examples of the filler, there may be used olefin polymers such as polyethylene and polypropylene; and fibrous materials such as glass fiber and carbon fiber.

The anode for the lithium secondary battery is fabricated by applying an anode material to the anode current collector, followed by drying. If necessary, other components as described above may be further included.

The anode current collector is generally fabricated to have a thickness of 3 to 500 $\square$. There is no particular limit to materials for the anode current collector, so long as they have suitable conductivity without causing chemical changes in the fabricated battery. As examples of materials for the anode current collector, mention may be made of copper, stainless steel, aluminum, nickel, titanium, sintered carbon, copper or stainless steel having a surface treated with carbon, nickel, titanium or silver, and aluminum-cadmium alloys. Similar to the cathode current collector, the anode current collector may also be processed to form fine irregularities on the surfaces thereof so as to enhance adhesion to the anode active material. In addition, the anode current collector may be used in various forms including films, sheets, foils, nets, porous structures, foams and non-woven fabrics.

As examples of the anode materials utilizable in the present invention, mention may be made of carbon such as non-graphitizing carbon and graphite-based carbon; metal composite oxides such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb or Ge; Me': Al, B, P, Si, Group I, Group II and Group III elements of the Periodic Table of the Elements, or halogens; $0 < x \leq 1$; $1 \leq y \leq 3$; and $1 \leq z \leq 8$); lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni based materials.

The separator for the lithium secondary battery is interposed between the cathode and anode. As the separator, an insulating thin film having high ion permeability and mechanical strength is used. The separator typically has a pore diameter of 0.01 to 10 $\square$ and a thickness of 5 to 300 $\square$. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The non-aqueous electrolyte for the lithium secondary battery is composed of a non-aqueous electrolyte and a lithium salt. As the non-aqueous electrolyte, a non-aqueous electrolytic solution, a solid electrolyte and an inorganic solid electrolyte may be utilized.

As the non-aqueous electrolytic solution that can be used in the present invention, for example, mention may be made of non-protic organic solvents such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, diethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

As examples of the organic solid electrolyte utilized in the present invention, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte utilized in the present invention, mention may be made of nitrides, halides and sulfates of lithium such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH and $Li_3PO_4$—$Li_2S$—$SiS_2$.

The lithium salt is a material that is readily soluble in the above-mentioned non-aqueous electrolyte and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SP_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

Mode for the Invention

Now, the present invention will be described in more detail with reference to the following Examples. These examples are provided only for illustrating the present invention and should not be construed as limiting the scope and spirit of the present invention.

EXAMPLE 1

A lithium secondary battery was fabricated according to the following procedure, by addition of a surfactant to electrodes.

1-1. Fabrication of Cathode 94.5% by weight of $LiCoO_2$ as a cathode active material, 2.5% by weight of Super-P (conductive material), 2.5% by weight of PVDF (binder), and 0.5% by weight of Pluronic™ F127 (BASF) as a surfactant were added to N-methyl-2-pyrrolidone (NMP) as a solvent to thereby prepare a cathode slurry. Thereafter, the resulting cathode slurry was coated, dried and pressed on an aluminum current collector to fabricate a cathode.

1-2. Fabrication of Anode

95% by weight of artificial graphite as an anode active material, 2.5% by weight of Super-P (conductive material), 2% by weight of PVDF (binder), and 0.5% by weight of Pluronic™ F127 (BASF) as a surfactant were added to NMP as a solvent to thereby prepare an anode slurry. Thereafter, the resulting anode slurry was coated, dried and pressed on a copper current collector to fabricate an anode.

1-3. Preparation of Electrolyte

A solution of ethylene carbonate (EC)/ethylmethyl carbonate (EMC) containing a 1M $LiPF_6$ lithium salt was used as an electrolyte.

1-4. Fabrication of Battery

A porous separator (Celgard™) was disposed between the cathode and anode fabricated in Sections 1-1 and 1-2, respectively, and the non-aqueous electrolyte prepared in Section 1-3 was injected into the resulting electrode assembly to thereby fabricate a lithium secondary battery.

EXAMPLE 2

A lithium secondary battery was fabricated in the same manner as in Example 1, except that 0.5% by weight of Pluronic™ F127 was added to a cathode with no addition thereof to an anode. Due to no addition of Pluronic™ F127 to the anode, a ratio of artificial graphite:Super-P:PVDF in the anode was adjusted to 95.5:2.5:2 (w/w).

EXAMPLE 3

A lithium secondary battery was fabricated in the same manner as in Example 1, except that 0.5% by weight of Pluronic™ F127 was added to an anode with no addition thereof to a cathode. Due to no addition of Pluronic™ F127 to the cathode, a ratio of $LiCoO_2$:Super-P:PVDF in the cathode was adjusted to 95:2.5:2.5 (w/w).

EXAMPLE 4

A lithium secondary battery was fabricated in the same manner as in Example 2, except that 0.5% by weight of perflurobutane sulfonate (PFBS) as a surfactant was added to a cathode and an anode, respectively.

Comparative Example 1

A lithium secondary battery was fabricated in the same manner as in Example 1, except that a surfactant was not added to electrodes.

Experimental Example 1

In fabrication of batteries in Examples 1 to 4 and Comparative Example 1, the time taken to reach the electrolyte wettability of about 10% on a cathode and an anode was measured. The results thus obtained are given in Table 1 below.

TABLE 1

| Ex. No. | Surfactants | | Added to | | Wettability measured |
| | PFBS* | F127** | Cathode | Anode | Dropping test (time) |
| --- | --- | --- | --- | --- | --- |
| Ex. 1 | — | ○ | ○ | ○ | 1 min 32 sec |
| Ex. 2 | — | ○ | ○ | — | 3 min 13 sec |
| Ex. 3 | — | ○ | — | ○ | 2 min 26 sec |
| Ex. 4 | ○ | — | ○ | ○ | 2 min 10 sec |
| Comp. Ex. 1 | — | — | — | — | 5 min 30 sec |

*PFBS: Perfluorobutane sulfonate
**F127: Pluronic ™ F127

As can be seen from Table 1, the electrolyte wettability in the electrode with addition of F127 as the surfactant reached a desired level of the wettability within a very short period of time, as compared to the electrode with no addition of the surfactant. In particular, the battery (Example 1) with addition of F127 to both of the cathode and the anode and the battery (Example 3) with addition of F127 to the anode exhibited an excellent wetting rate.

In addition, it was confirmed that the electrode with addition of PFBS as the surfactant exhibits excellent electrolyte wettability.

Experimental Example 2

For batteries in Examples 1 to 4 and Comparative Example 1, the battery capacity, rate properties and cycle properties were tested. The results thus obtained are given in Table 2 below.

TABLE 2

| | Surfactants | | Added to | | Battery performance | | |
| | | | | | | | Cycle |
| | | | | | Capacity | Rate | (500 |
| Ex. No. | PFBS | F127 | Cathode | Anode | (mAh) | (1 C) | times) |
| --- | --- | --- | --- | --- | --- | --- | --- |
| Ex. 1 | — | ○ | ○ | ○ | 767.6 | 97.3% | 79.3% |
| Ex. 2 | — | ○ | ○ | — | 754.3 | 96.8% | 68% |
| Ex. 3 | — | ○ | — | ○ | 761.3 | 97% | 70% |
| Ex. 4 | ○ | — | ○ | ○ | 753.2 | 96.5% | 65% |
| Comp. Ex. 1 | — | — | — | — | 748.2 | 96.3% | 48% |

As can be seen from Table 2, batteries of Examples 1 to 4 exhibited improvements of the battery capacity, rate properties and cycle properties, as compared to the battery of Comparative Example 1. In particular, it was confirmed that batteries of Examples 1 to 4 exhibit significant improvements of cycle properties at 500 cycles.

Comparative Example 2

A lithium secondary battery was fabricated in the same manner as in Example 1, except that 0.5% by weight of polyethylene glycol dimethyl ether as a surfactant was added to an electrolyte, instead of electrodes. Due to no addition of polyethylene glycol dimethyl ether to the electrodes, a ratio of $LiCoO_2$:Super-P:PVDF in the cathode was adjusted to 95:2.5:2.5 (w/w), and a ratio of artificial graphite:Super-P:PVDF in the anode was adjusted to 95.5:2.5:2.5 (w/w).

Experimental Example 3

In fabrication of a battery in Comparative Example 2, the time taken to reach the electrolyte wettability of about 10% on a cathode and an anode was measured. As a result, the time required to reach the wettability of about 10% was 5 min, thus confirming that the desired improvement of the electrolyte wettability with the addition of the surfactant was not obtained.

In order to confirm the reason why improvement of the wettability was not achieved and the cause for deterioration of the battery performance, despite the in-corporation of the surfactant (polyethylene glycol dimethyl ether), Cyclic Voltammetry was carried out.

For purpose of comparison with the battery of Comparative Example 2, the same experiment was carried out on the battery of Example 1 according to the present invention.

As a result, the battery of Comparative Example 2 undergone an electrochemical reaction within the operation voltage range of the battery, whereas a PEO-PPO block copolymer in the battery of Example 1 did not show the occurrence of electrochemical reaction, thus confirming that the hydrophilicity and lipophilicity, corresponding to the inherent physical properties of the block copolymer, were maintained intact.

Industrial Applicability

As apparent from the above description, a lithium secondary battery according to the present invention provides advantageous effects such as significant improvement in the wettability of an electrolyte on the electrodes, thereby increased battery capacity and improved rate and cycle properties of the battery, and a significant reduction of a manufacturing process time of the battery, by the incorporation of a surfactant to electrodes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A lithium secondary battery comprising:
   (A) a cathode comprising layered lithium-containing cobalt or nickel oxide compounds, or such layered compounds substituted with one or more transition metals; lithium manganese oxides selected from the group consisting of $Li_{1+x}Mn_{2-x}O_4$ ($0 \leq x \leq 0.33$), $LiMnO_3$, $LiMn_2O_3$ and $LiMnO_2$; lithium copper oxide ($Li_2CuO_2$); vanadium oxides selected from the group consisting of $LiV_3O_8$, $V_2O_5$ and $Cu_2V_2O_7$; Formula $LiNi_{1-x}M_xO_2$ (M=Co, Mn, Al, Cu, Fe, Mg, B or Ga, and $0.01 \leq x \leq 0.3$); lithium manganese composite oxides of Formula $LiMn_{2-x}M_xO_2$ (M=Co, Ni, Fe, Cr, Zn or Ta, and $0.01 \leq x \leq 0.1$), or Formula $Li_2Mn_3MO_8$ (M=Fe, Co, Ni, Cu or Zn); $LiMn_2O_4$ wherein a portion of Li is substituted with alkaline earth metal ions or disulfide compounds; $Fe_2(MoO_4)_3$, or $LiFe_3O_4$;
   (B) a hydrophobic anode comprising non-graphitizing carbon; graphite-based carbon; metal composite oxides selected from the group consisting of $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb or Ge; Me': Al, B, P, Si, Group I, Group II and Group III elements of the Periodic Table of the Elements, or halogens; $0 < x \leq 1$; $1 \leq y \leq 3$; and $1 \leq z \leq 8$); lithium metals; lithium alloys; silicon-based alloys; tin-based alloys; metal oxides wherein the metal is selected from the group consisting of Sn, Pb, Sb, Ge and Bi; conductive polymers; or Li—Co—Ni containing materials; and
   (C) a hydrophilic electrolyte;
   wherein:
   (i) a surfactant is incorporated into the anode for improvement of the wettability of the anode by the electrolyte;
   (ii) the surfactant has a hydrophilic portion and a hydrophobic portion and is incorporated into the anode such that the hydrophilic portion of the surfactant exhibits an affinity for the hydrophilic electrolyte and the hydrophobic portion of the surfactant exhibits an affinity for the hydrophobic anode;
   (iii) content of the surfactant is in the range of 0.01 to 20% by weight, based on the total weight of an anode mix used to fabricate the anode;
   (iv) the surfactant is a nonionic surfactant, which is a block copolymer having a hydrophilic portion and a hydrophobic portion;
   (v) the block copolymer is a PEO-PPO block copolymer wherein the PEO-PPO block copolymer is a PEO-PPO-PEO triblock copolymer; and;
   (vi) the content of PEO unit in the PEO-PPO-PEO triblock copolymer is in the range of 60 to 70% by weight, based on the total weight of the copolymer.

2. A lithium secondary battery comprising:
   (A) a cathode comprising layered lithium-containing cobalt or nickel oxide compounds, or such layered compounds substituted with one or more transition metals; lithium manganese oxides selected from the group consisting of $Li_{1+x}Mn_{2-x}O_4$ ($0 \leq x \leq 0.33$), $LiMnO_3$, $LiMn_2O_3$ and $LiMnO_2$; lithium copper oxide ($Li_2CuO_2$); vanadium oxides selected from the group consisting of $LiV_3O_8$, $V_2O_5$ and $Cu_2V_2O_7$; Formula $LiNi_{1-x}M_xO_2$ (M=Co, Mn, Al, Cu, Fe, Mg, B or Ga, and $0.01 \leq x \leq 0.3$); lithium manganese composite oxides of Formula $LiMn_{2-x}M_xO_2$ (M=Co, Ni, Fe, Cr, Zn or Ta, and $0.01 \leq x \leq 0.1$), or Formula $Li_2Mn_3MO_8$ (M=Fe, Co, Ni, Cu or Zn); $LiMn_2O_4$ wherein a portion of Li is substituted with alkaline earth metal ions or disulfide compounds; $Fe_2(MoO_4)_3$, or $LiFe_3O_4$;
   (B) a hydrophobic anode comprising non-graphitizing carbon; graphite-based carbon; metal composite oxides selected from the group consisting of $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb or Ge; Me': Al, B, P, Si, Group I, Group II and Group III elements of the Periodic Table of the Elements, or halogens; $0 < x \leq 1$; $1 \leq y \leq 3$; and $1 \leq z \leq 8$); lithium metals; lithium alloys; silicon-based alloys; tin-based alloys; metal oxides wherein the metal is selected from the group consisting of Sn, Pb, Sb, Ge and Bi; conductive polymers; or Li—Co—Ni containing materials; and a hydrophilic electrolyte;
   wherein:
   (i) a surfactant is incorporated into the anode for improvement of the wettability of the anode by the electrolyte;
   (ii) the surfactant has a hydrophilic portion and a hydrophobic portion and is incorporated into the anode such that the hydrophilic portion of the surfactant exhibits an affinity for the hydrophilic electrolyte and the hydrophobic portion of the surfactant exhibits an affinity for the hydrophobic anode;

(iii) content of the surfactant is in the range of 0.01 to 20% by weight, based on the total weight of an anode mix used to fabricate the anode; and
(iv) the surfactant is perfluoroalkyl sulfonate.

3. The battery according to claim 2, wherein the surfactant is perfluorobutane sulfonate.

* * * * *